United States Patent [19]

Henley

[11] Patent Number: 5,459,410

[45] Date of Patent: Oct. 17, 1995

[54] METHOD AND APPARATUS FOR AUTOMATICALLY INSPECTING AND REPAIRING AN ACTIVE MATRIX LCD PANEL

[75] Inventor: Francois J. Henley, Los Gatos, Calif.

[73] Assignee: Photon Dynamics, Inc., Milpitas, Calif.

[21] Appl. No.: 46,546

[22] Filed: Apr. 13, 1993

Related U.S. Application Data

[62] Division of Ser. No. 716,592, Jun. 17, 1991, Pat. No. 5,235,272.

[51] Int. Cl.⁶ ................................................. G01R 31/02
[52] U.S. Cl. ........................ 324/770; 324/537; 345/904
[58] Field of Search ............................. 324/770, 158.1, 324/537, 528, 527; 437/8; 382/8; 345/904

[56] References Cited

U.S. PATENT DOCUMENTS

| | | | |
|---|---|---|---|
| 3,992,663 | 11/1976 | Seddick | 324/537 |
| 4,368,523 | 1/1983 | Kawate | 345/206 |
| 4,444,801 | 4/1984 | Hongo et al. | 430/5 |
| 4,463,073 | 7/1984 | Miyauchi et al. | 430/5 |
| 4,507,605 | 3/1985 | Geisel | 324/537 |
| 4,510,222 | 4/1985 | Okunaka et al. | 430/5 |
| 4,542,333 | 9/1985 | Koontz | 324/529 |
| 4,630,355 | 12/1986 | Johnson | 437/8 |
| 4,631,576 | 12/1986 | St. John | 348/809 |
| 4,633,242 | 12/1986 | Sekiya | 345/205 |
| 4,636,403 | 1/1987 | Fisanick et al. | 427/554 |
| 4,714,875 | 12/1987 | Bailey et al. | 324/537 |
| 4,727,234 | 2/1988 | Oprysko et al. | 219/121.6 |
| 4,776,022 | 10/1988 | Fox et al. | 382/8 |
| 4,819,038 | 4/1989 | Alt | 324/770 |
| 4,825,201 | 4/1989 | Watanabe et al. | 345/207 |
| 4,862,075 | 8/1989 | Choi et al. | 324/753 |
| 4,875,006 | 10/1989 | Henley et al. | 324/753 |
| 4,899,105 | 2/1990 | Akiyama | 324/770 |
| 4,975,635 | 12/1990 | Takahashi et al. | 324/158.1 |
| 4,983,911 | 1/1991 | Henley | 324/770 |
| 5,017,755 | 5/1991 | Yahagi et al. | 219/121.68 |
| 5,034,683 | 7/1991 | Takahashi et al. | 324/753 |
| 5,043,297 | 8/1991 | Suzuki et al. | 437/51 |
| 5,081,687 | 1/1992 | Henley et al. | 382/8 |

FOREIGN PATENT DOCUMENTS

| | | |
|---|---|---|
| 3111393 | 9/1982 | Germany . |
| 56-154678 | 11/1981 | Japan . |
| 56-15326 | 11/1981 | Japan . |
| 58-99768 | 6/1983 | Japan . |
| 0246727 | 10/1988 | Japan . |
| 0009375 | 1/1989 | Japan . |

OTHER PUBLICATIONS

Henley, "Electro–Optic Technology Support GigaHertz Test Speeds", *Electronics Test*, Sep. 1988.

Barton, "Characterization of High–Speed (Above 500 MHz) Devices Using Advanced ATE–Techniques, Results and Device Problems", *ITC*, Aug. 1989.

(List continued on next page.)

*Primary Examiner*—Ernest F. Karlsen
*Attorney, Agent, or Firm*—Townsend and Townsend and Crew

[57] ABSTRACT

LCD panels are inspected in-process to measure pixel decay, turn-on time and parasitic capacitance and/or identify pixel defects and line defects. Prior to final assembly, panels identified as having sufficiently few repairable defects are repaired. Line defects may be repaired. Further pixel defects may be repaired when redundant structures are included by splicing out the defective TFT or storage capacitor and splicing in a redundant, built-in TFT or storage capacitor. The inspection and repair systems are linked through a repair file. The inspection system identifies each defect by type and location and includes such information in the repair file. The repair system accesses such file and follows a prescribed repair method for a given type of defect at the location of such defect. The inspection system includes an automated non-contact voltage imaging system. The repair system includes lasers and means for repairing defects by adding metallization.

8 Claims, 12 Drawing Sheets

OTHER PUBLICATIONS

Henley, et al., "Systems Solutions Based on Electro–Optic Sampling to High Speed IC Test Problems", SPIE vol. 795 pp. 345–351.

Henley, et al., "Test Head Design Using Electro–Optic Receivers and GaAs Pin Electronics for a GigaHertz Production Test System".

Henley, et al. "Achieving ATE Accuracy at GigaHertz Test Rates: Comparison of Electronic and Electro–Optic Sampling Technologies".

Kratzer, et al., "High–Speed Pattern Generator and GaAs Pin Electronics for a GigaHertz Production Test System".

Henley, "Using Electro–Optic Sampling Technology for Accurate GigaHertz ATE: Overview of the Art".

Henley, "An Ultra High Speed Test System", *IEEE,* Feb. 1989, pp. 18–24.

Novellino, "Electro–Optic Device Tester Tops 1–GHz", *Electronic Design,* Sep. 8, 1988.

McCarty, "System Tests Devices at GHz Rates", *Design News,* Apr. 10, 1989.

Luo, et al., "Testing and Qualifications of a–Si TFT–LC Color Cells for Military Avionics Applications", *SID 90 Digest.*

Becker, et al., "Measurement of Electro–Optic Characteristics of LCDs", *SID 90 Digest.*

3,459,410

METHOD AND APPARATUS FOR AUTOMATICALLY INSPECTING AND REPAIRING AN ACTIVE MATRIX LCD PANEL

This is a division of application Ser. No. 07/716,592 filed Jun. 17, 1991, now U.S. Pat. No. 5,235,272.

CROSS REFERENCE TO RELATED APPLICATIONS

This invention is related to the commonly-assigned U.S. Pat. No. 4,983,911, issued Jan. 8, 1991 for VOLTAGE IMAGING SYSTEM USING ELECTRO-OPTICS, and continuation-in-part applications Ser. No. 07/582,577 filed Sep. 13, 1990, now U.S. Pat. No. 5,097,201 and Ser. No. 07/654,709, filed Feb. 13, 1991, now U.S. Pat. No. 5,124,635. This invention also is related to the commonly-assigned U.S. patent application, Ser. No. 07/687,473, filed Apr. 18, 1991, now U.S. Pat. No. 5,164,565, for LASER-BASED SYSTEM FOR DEPOSITION AND REMOVAL.

BACKGROUND OF THE INVENTION

This invention relates to a method and apparatus for automatically inspecting and repairing an active matrix LCD panel. Inspection is achieved by electro-optic voltage imaging, while repair is achieved by laser cutting and material deposition. The inspection process results in the performance information and the generation of a list of panel defects, including the type and location of each defect. Automated repair is performed by accessing such list to identify a defect to be repaired. Prescribed repair operations are performed based upon the defect type and location.

Conventional display panel manufacturing yields have been unsatisfactory, causing display panel cost to be a large portion of the final cost of a micro-computer system. In addition, testing of display panels has been difficult. For active matrix LCD panels the problem is even more troublesome. Active matrix LCD panels have added complexity over the prior simple matrix panels. In addition to the need for satisfactory continuity among electrode lines and adequate resistance levels, active matrix panels have multilayer insulation and dynamic switching characteristics. The precise location of the defect is important information about the panel fabrication process.

Circuit panels such as active matrix LCD panels include a plurality of connections and independent circuits on a flat surface. Because the densities available for such panels are increasingly high and the spacing between circuit lines are decreasingly small, defects frequently occur during the manufacturing and assembly processes. For high density active matrix LCD panels, a typical yield of shipped panels is approximately 10%. Such panels require an array of thin-film transistors to be fabricated on a large glass substrate (e.g., active plate). The number of thin-film transistors often surpasses one million, while the process area can be as large as 350 cm$^2$. Such volumes and densities present a formidable yield challenge even for VLSI and ULSI manufacturing processes. Because of the significant percentage of defective panels, 100% testing of each such panel is common.

Active matrix LCD panels are formed by an active plate as described above, along with polarizers, filters, sealant and additional materials. Any defects which occur in the active plate conventionally go undetected until final assembly. Conventionally, such panels are activated and visibly inspected for pixels which do not activate. Once the panel is fully assembled, sealed and filled, the components typically cannot be reworked and reused.

Accordingly, there is a need for an automatic system for identifying defects early in the manufacturing process (e.g., in-process inspection) so as to avoid subsequent manufacturing steps for panels having a large number of defects. Further, there is a need for a method and apparatus for repairing panels having sufficiently few defects. In addition, there is a need for automating and linking the inspection and repair processes so as to increase test throughput.

SUMMARY OF THE INVENTION

According to the invention, inspection and repair of partially assembled and/or fully assembled high density active matrix LCD panels is performed to obtain performance data and improve production yields. A test system inspects the panel for line and pixel defects and forms a file of defect information. For panels having too many defects to be repaired in a cost effective manner, the defective panel is discarded. Thus, for in-process inspection, defective panels are identified prior to incurring the added labor and material costs to complete what would become a defective final assembled LCD panel. By inspecting prior to final assembly various repair strategies may be applied. By again inspecting after final assembly, defects caused during final assembly can be identified and repaired.

According to one aspect of the invention, a voltage imaging system is used to identify panel defects. A 2-d electro-optic modulator causes surface potentials of the panel to be measured with a spatial resolution of approximately 30 micrometers and voltage resolution of less than 100 millivolts. Voltage imaging allows the panel to be scanned in a non-contact manner to generate a defect file. Such an imaging system enables discrimination between point and line defects.

According to another aspect of the invention, pixel defect inspection methodology is performed to identify pixel defects including short to pixel data defects, short to pixel gate defect, open circuit pixel defects and short to capacitor ground defects. To identify whether an active plate has any pixel defects, normal timing is applied to the data lines and gate lines and a voltage image sample is captured. Non-activity of any pixel is known to be caused by a defect. To identify the type and precise location of a pixel defect, data-high timing is applied to the gate lines and data lines of the active plate and a voltage image sample again is captured. Based on a comparison of the results for the normal timing and data-high timing results, short to pixel data defects are identified and located. Next, gate-high timing is applied to obtain another voltage image sample. Based on the comparison of all three timing results, the short to pixel gate defects are identified and located. Under another test, capacitor-high timing is applied to identify open circuit pixel defects and short to capacitor ground defects.

According to another aspect of the invention, line defects are identified and located by capturing a voltage image sample using normal timing and analyzing the voltage image results to identify a partial line of inactive pixels. Further, the data lines alone may be activated and imaged to see the precise location of a data line open circuit defect. Similarly, the gate lines alone may be activated and imaged to see the precise location of a gate line open circuit defect. Cross line shorts are identified by a voltage divider pattern which appears in the vicinity of the short circuit.

According to another aspect of the invention, pixel decay, turn-on time and parasitic capacitance is measured for each pixel. Pixel decay is measured by capturing samples of several voltage images. One sample is taken each frame wherein each successive sample is delayed by one sample time so that the decay of the pixel voltage is indicated by the measured voltage values as the stored voltage decays. Turn-on time is measured by capturing voltage image samples during separate image cycles, where a different gate pulse width is used for each cycle. The pulse width is selected to vary from a small width at which the pixel is unable to charge fully up to the data line voltage, to a large width at which the pixel is able to charge up to the data line voltage. The various voltage level samples for the varying pulse widths indicate the rise time for the pixel. Parasitic capacitance is measured by capturing a voltage image sample for gate high timing and normal timing. The difference in pixel voltage for the two timings (for normal pixels) is approximately equal to the voltage applied to the gate line times the ratio of the parasitic capacitance to the storage capacitance. As the gate voltage and storage capacitance are known, the parasitic capacitance can-be calculated for each pixel.

According to another aspect of the invention, a laser-based repair and deposition system receives a repair file generated by the imaging system. The repair file identifies the location and type of each panel defect. The repair system automatically positions the panel and a cutting laser in the vicinity of a defect. The laser then selectively removes passivation material to expose conductive paths. Additionally the laser may cut conductive lines to sever a short circuit. Thereafter, an organic metallic film is deposited and dried. A laser then traces a line in the film to decompose the film along the line to form a conductive path. The laser traces such line so as to repair the open circuit line defect or short circuit line defect. Excess film then is cleaned away.

According to another aspect of the invention, the repair methodology includes using a laser to open contact holes in passivation or other layers in preparation for material deposition. A solid state film then is applied automatically onto a defect area and dried. Another laser then forms a conductive line with the film by tracing a line. The location of such line is selected to repair the panel defect. Such writing speed is approximately 100 to 300 micrometers per second. The excess film then is cleaned away.

According to another aspect of the invention, automated prescribed repair operations are performed at a given pixel defect location based upon the type of defect identified. For an open circuit defect, the passivation is removed in the area of the open circuit, including an area over each side of a disconnected conductive line. The film then is deposited and the laser traces a line so as to connect the previously disconnected line. For a cross short circuit, the laser removes passivation and severs one of two intersecting conductive lines to isolate the such conductive lines. A bridge then is formed with the film so as to connect portions of the severed line along a path which does not short to the other conductive line. For a line to line short, passivation is removed, then the conductive connection between the adjacent lines is cut to remove the short circuit path.

According to another aspect of the invention, redundant capacitors and thin film transistors (TFTs) provided on the substrate can be substituted for broken capacitors and TFTs to repair defective pixels.

Other flat circuit panels, such as pc boards and multi-chip modules also may be tested and repaired according to the apparatus and method described herein.

The invention will be better understood by reference to the following description of specific embodiments in connection with the attached drawings.

DESCRIPTION OF SPECIFIC EMBODIMENTS

Circuit Panels

Figure 1:
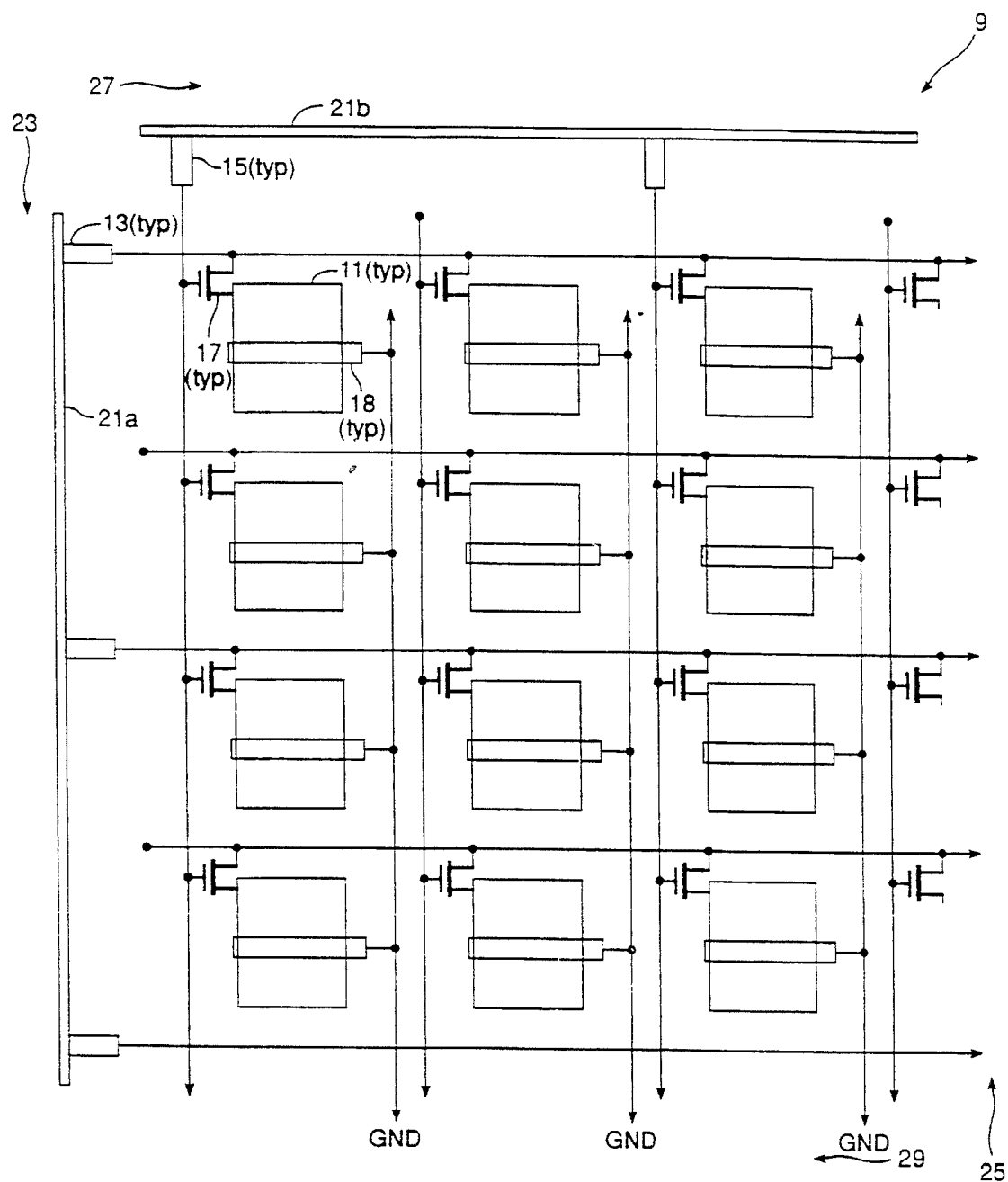
FIG. 1 is a diagram of a portion of a prior art active plate for an active matrix LCD panel.

FIG. 1 shows a partial circuit array 9 for an active plate of a high-density active-matrix liquid crystal display panel. The plate 9 includes an array of pixels 11. Each pixel 11 is activated by addressing simultaneously an appropriate data line 13 and gate line 15. A drive element 17 (i.e., thin-film transistor) and a storage capacitor 18 are associated with each pixel 11. The data lines 13, gate lines 15, pixels 11, pixel drive elements 17 and storage capacitors 18 are deposited on the clear glass "active" plate by a lithographic or similar fabrication process. The storage capacitor 18 is formed by a thin conducting film separated from pixel 11 by a non-conducting dielectric film. Each storage capacitor 18 is coupled to an a.c. ground. Because of the high pixel densities, the close proximity of the gate lines and data lines, and the complexity of forming the pixel drive elements, there is a significant probability of defects occurring during the fabrication process.

Figure 2:
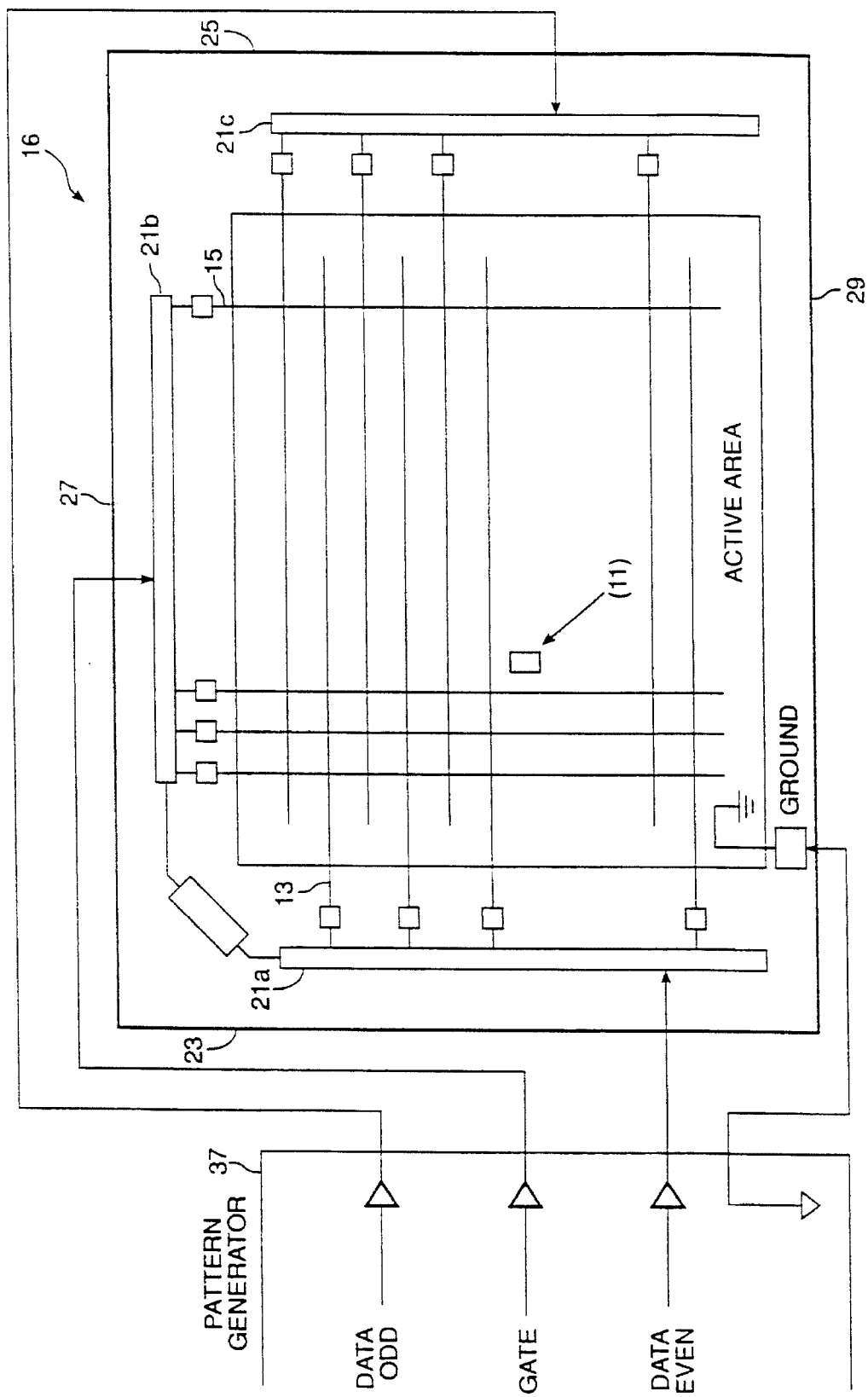
FIG. 2 is a diagram of an active plate coupled to a pattern generator.

Each active plate 9 has an electro-static discharge (ESD) shorting bar 21 at two or more of the four edges. A respective ESD bar 21 shorts all the data lines 13 or gate lines 15 which terminate at a respective edge. For an interdigitated panel, data lines are terminated at two opposing edges while gate lines are terminated at one or both of the other two edges. Thus, three or four shorting bars are included, one per panel edge 23, 25, 27, 29. Until scribing and final testing of the LCD panel, the ESD bars 21 remain attached to the plate 9 so as to avoid electro-static charge buildup. Prolonged separation of the plate 9 from the shorting bar 21 or another grounding apparatus may cause the electrostatic charge to accumulate and cause damage to the active plate circuitry. For an interdigitated panel 16 as shown in FIG. 2, every other data line 13 is terminated at shorting bar 21a near one panel boundary 23, while the other data lines are terminated at shorting bar 21c near the opposite, but parallel, boundary 25. Every other gate line 15, however, is terminated at shorting bar 21b near one panel boundary 27 adjacent and generally orthogonal to the data line panel boundaries 23, 25. A resistor or other partially conducting element 102 may be included between the shorting bars to allow protection against charge buildup between the shorting bar elements. The impedance of this element 102 should be high enough to enable all voltage imaging and leakage measurements to be made but low enough for adequate ESD protection.

LCD Panel defects include pixel defects and/or line defects. Pixel defects include short to pixel gate, short to pixel data, short to capacitor ground and open pixel defects. Line defects include line-to-line shorts (e.g., data line to data line or gate line to gate line), cross shorts (e.g., data to gate), and open line defects.

Other flat circuit panels, such as pc boards and multi-chip modules also may be tested and repaired according to the apparatus and method described herein.

The following is a description of a voltage imaging test system embodiment for inspecting a panel. Examples of voltage imaging test system embodiments are more fully described in the respective commonly-assigned U.S. Pat. No. 4,983,911, issued Jan. 8, 1991 for VOLTAGE IMAGING SYSTEM USING ELECTRO-OPTICS, and continuation-in-part applications of the same title, Ser. No. 07/582, 577 filed Sep. 13, 1990 and Ser. No. 07/654,709 filed Feb. 13, 1991. As previously recited, such patent and patent applications are incorporated herein by reference and made a part hereof.

Voltage Imaging Test Apparatus Configuration

Figure 3A:
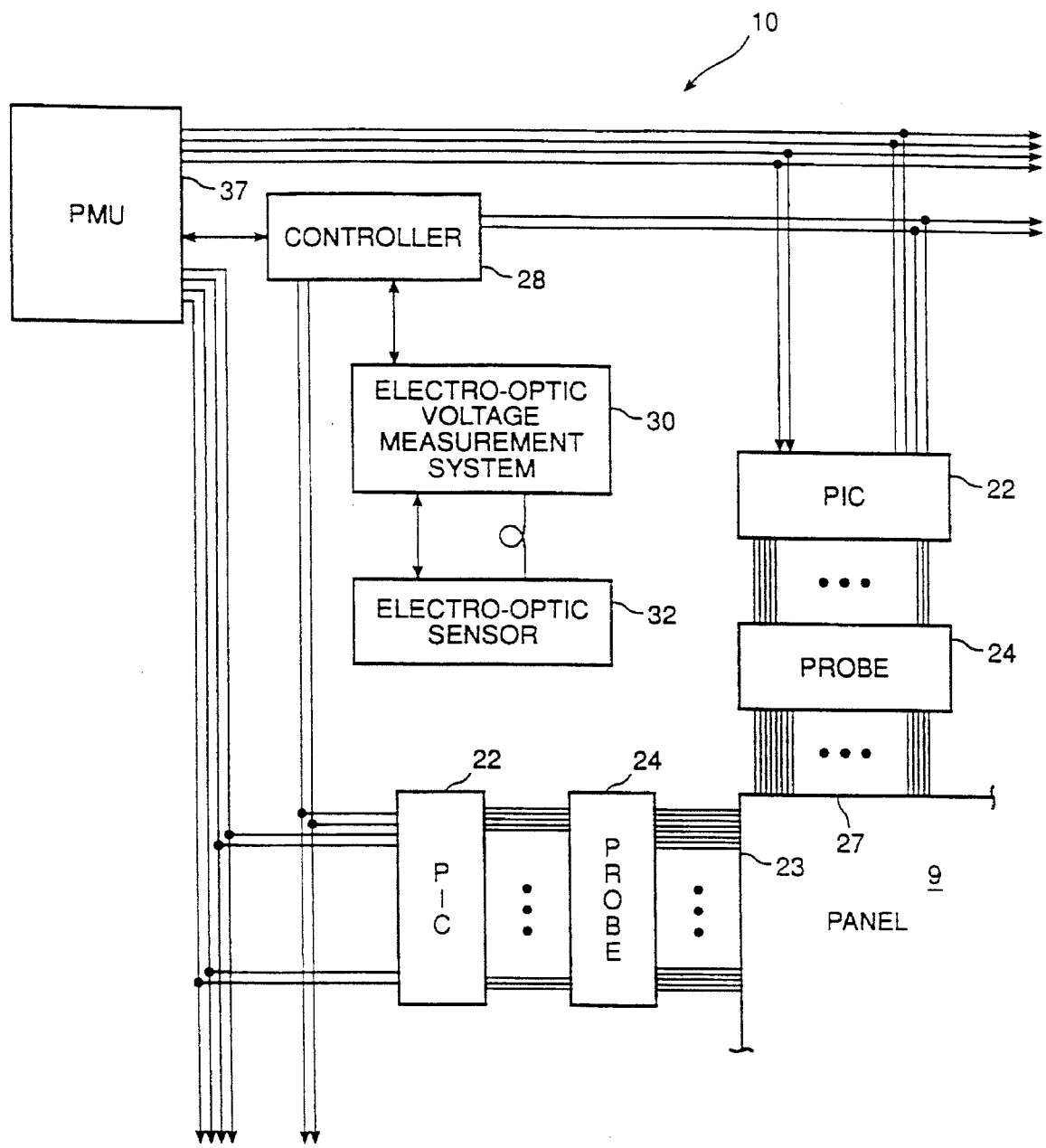
FIG. 3a is a block diagram of one portion of a test apparatus including a voltage imaging system.

Referring to FIG. 3a, a test apparatus 10 according to this invention is shown, including panel interface circuits 22 (PICs) interfaced to the panel under test (PUT) 9 through respective probes 24. The panel interface circuit 22 relays signals from a pattern generator (PG) 101 and an optional conventional precision measurement unit (PMU) 37 to the drive lines 13 and gate lines 15 of the PUT 9. The panel interface circuits 22 also may relay signals from the drive lines 13 or gate lines 15 to the PMU 37. A test controller 28 is provided to control whether the PMU 37 or PG 101 is connected to PUT 9. An electro-optic voltage measurement system 30 is for imaging the voltages along the drive lines or gate lines. The electro-optic system 30 includes an electro-optic sensor 32. The electro-optic sensor 32 allows the detection of electrical signals in an area without direct contact with the area. The imaging can employ polarized, non-polarized or nonpolarized, split-bias techniques as part of the detection system.

Prior to testing, the PUT 9 is coupled to the test system 20 at the panel shorting bars 21 through contact probes 24. The probes 24 may include, for example, 100 contacts for coupling to a one inch span of the panel boundary. In another example depicted in FIG. 2, if each of the probes 24 are connected to the entire panel boundary, very few contacts are necessary (typically 3–15, depending if the probes are input/output or individually assigned). The number of contacts and boundary span may vary. The PUT 9 may be connected in some way to a source of power (not shown) in order to produce voltages at selected sites on its surface.

Figure 3B:
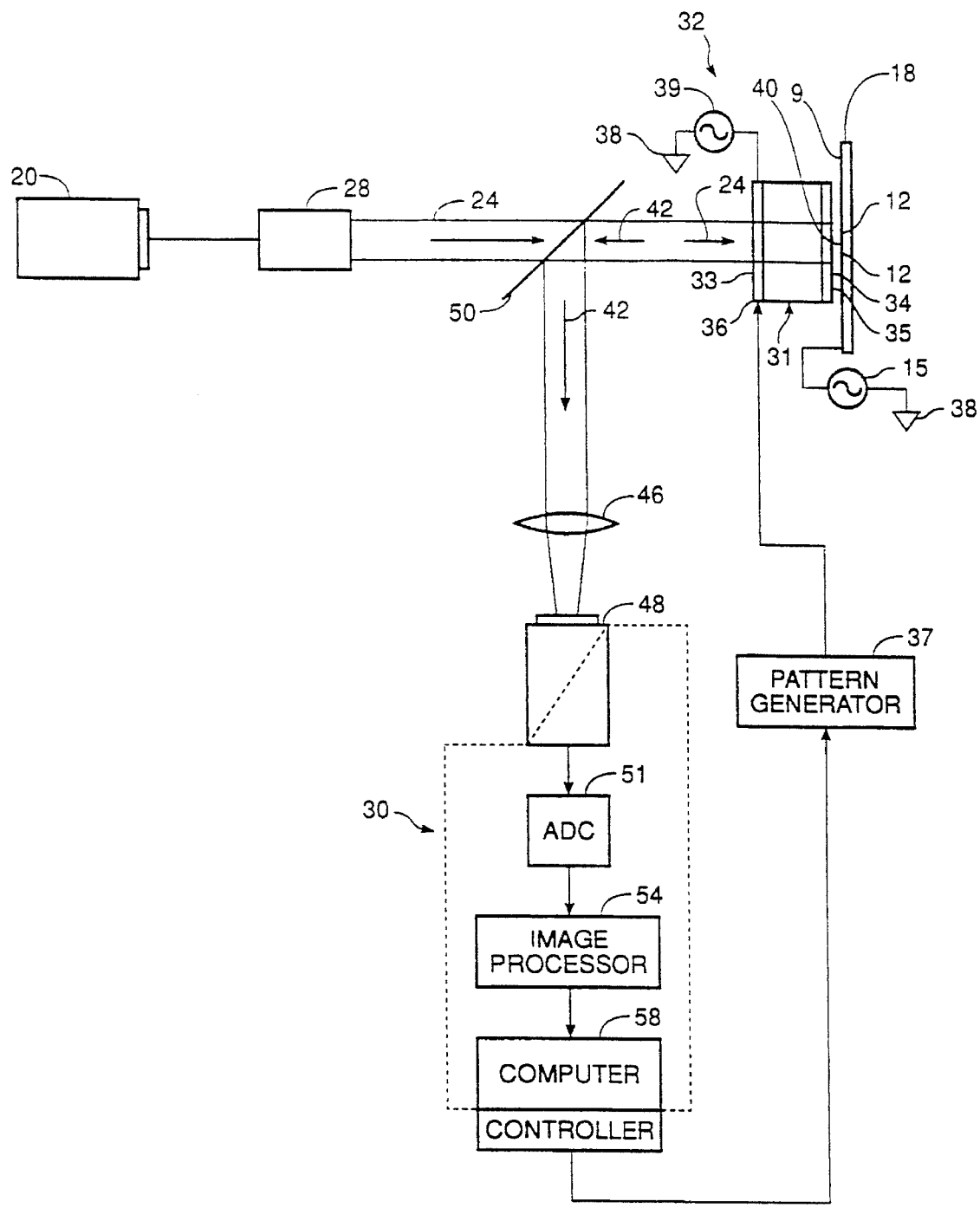
FIG. 3b is a block diagram of the test apparatus illustrating a structure including a voltage imaging system.

Referring to FIG. 3b, there is shown one example of a configuration for an electro-optic sensor 32. The optical energy from source 20 is channeled and processed to produce an optical input beam 24 which may expanded and collimated with a beam expander 28. For this purpose, there may be provided a lens, mirror or fiber optic system to expand and collimate the source beam into the input beam 24. The collimated input beam preferably has a constant or at least a known power density cross-section.

The input beam 24 is directed into an electro-optic modulator means 31 of a specific type, structure and possibly atomic or molecular axis orientation. A suitable modulator 31 may be a modulator fabricated with an NCAP or PDLC film. This power modulator 31 directly modulates light intensity (it is not, to first order, a polarizing device) and utilizes the light scattering properties of liquid crystal droplets encapsulated in a polymer matrix. The encapsulation structure produces a curvilinear alignment of the liquid crystal molecules, and this aligned phase can be optically switched by a controlled electric field as desired. The device is therefore switched from a highly light scattering state to a highly transmissive state. Biasing the device between the two states allows the modulator to exhibit a roughly linear light to voltage transfer function. The electro-optic modulator means 31 has a first face 33 and an opposing second face 34 to allow longitudinal probing geometries, as explained hereinafter. The first face 33 has a conductive coating 36 which is transparent, such as indium tin oxide (ITO), and which is electrically coupled through a bias element 39 to a voltage common 38, such as ground. The bias element 39 may provide either a zero, fixed or variable voltage to establish a voltage differential relative to a testing voltage, as applied to the PUT 9, as hereinafter explained. The second face 34 of modulator means 31 has a highly-reflective nonconductive coating 35 which produces a retro-reflection of the input beam 24. The second face 34 is disposed to be adjacent an area 40 of the surface of the PUT 9. The modulator means 31 is oriented to intercept at least a portion of the input beam 24 directed into the modulator through the first face 33 to impinge on the second face 34 at a position of the modulator means 31 closely adjacent the area 40 of the surface of the PUT 9. An excitation voltage source 15 is coupled to conductors on the PUT 16 or 18 to provide a source of variable voltage to the PUT 9 at positions 12. Thus the bias function and the excitation function are separated and distributed among bias source 39 and source 15. The voltages at positions 12 at or near the surface of PUT 9 interact with the modulator means 31 to cause changes in the optical power transmission of the input beam 24 in alignment with positions 12 of voltages. This is observable as a spatially-dependent change in collimated alignment of an output beam 42 with the input beam 24, the changes being proportional to voltages at the positions 12 on the surface of PUT 9.

The electro-optic modulator 31 can also be constructed of a class of solid crystals which admit to a geometry for longitudinal probing and utilize the Pockels Effect. Suitable solid crystals for this geometry include class 42m (for example KDP), class 43m (for example GaAs), and point 23 group symmetries (for example BSO and BGO). The preferred solid crystal is KDP or deuterated KDP (DKDP), and the size is at least 2 inches (5 cm) on a side of the second face. Crystals as large as 6 to 8 inches are known but are considerably more expensive than smaller crystals. The Pockels Effect modulate light polarization and therefore polarizing elements would have to be inserted in the diagram of FIG. 3b.

The output beam 42 is relayed to a sensitive camera 48 through for example a focussing lens 46, which intercepts the spatially-dependent power modulation for producing as seen by the camera an observable map in two dimensions having features corresponding to voltage magnitude. Thus the camera represents an the combination of the last stage of the electro-optic sensor 32 and the first stage of the electro-optic voltage measurement system 30. Additionally, image processing can be used to enhance the ratio of signal to noise through manipulation in digitized format of the image captured by the camera 48.

The imaged signals are optically captured with camera 48, which generates analog electrical signals corresponding to the image. The analog signals are received at analog to digital converter (ADC) 51 and input to image processor 54. The image processor 54 communicates with computer 58 and specifically its controller element 28, which in turn controls the PMU or pattern generator 37. The pattern generator 37 provides a voltage pattern to the modulator 31.

Identification of Pixel Defects

Image data from the imaging system 10 is analyzed to identify defect types by the pattern of the defect. Pixel defects are recognized by the appearance of a single defect in an area of functioning pixels (or where most of the surrounding pixels are functional). The pixel defects include short to pixel gate, short to pixel data, short to capacitor ground and open circuit.

To determine whether defective pixels are present various signal timing patterns are applied to the data lines 13 and gate lines 15. In addition, a given ground level is maintained for the storage capacitors 18. FIGS. 4a–d show various timing patterns and pixel voltage responses for each pixel defect. Table A below summarizes the pixel voltage responses in a matrix of pixel defect type to timing type:

TABLE A

| Defect | Timing | | | |
| --- | --- | --- | --- | --- |
| | Normal Timing | Data-High Timing | Gate-High Timing | Cap-High Timing |
| No Defect | High | High | High | Low |
| TFT Open | Low | Low | Low | Intermediate |
| Short to Gate | Low | Low | High | Low |
| Short to Data | Low | High | High | Low |
| Short to Cap. GND | Low | Low | Low | High |

Figure 4A:
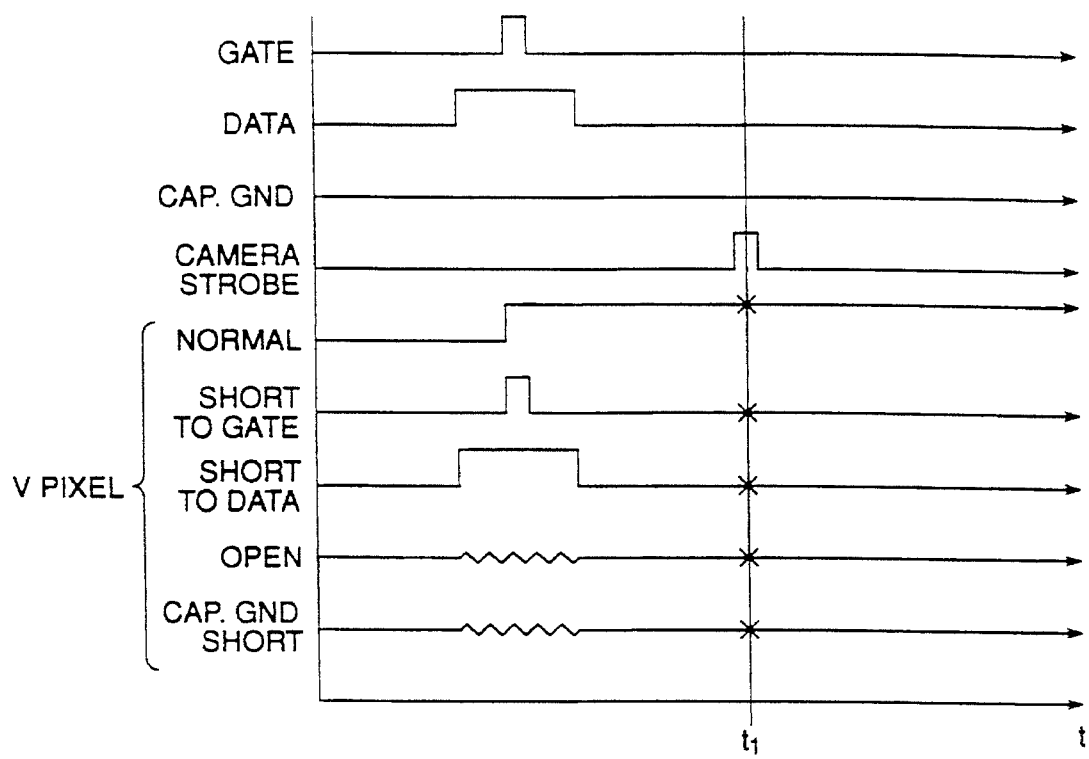
FIGS. 4a–d are charts of timing patterns applied to the active panel to distinguish among four types of pixel defects.

Normal timing is shown in FIG. 4a in which gate lines 15 are pulsed while the data lines 13 are active. In addition, the ground lines are maintained at a low level. The data lines 13 return to ground shortly after the gate line pulse. The imaging system 10 captures an image after the pulses at time $t_1$, during the camera strobe pulse. The pixel voltage as imaged by the imaging system 10 is high for a normal pixel having no defect. In every other case, the voltage is low as shown in FIG. 4a and listed in Table A under normal timing. Accordingly, an image data is captured for a panel using normal timing to determine whether the panel has any pixel defects. If so, then additional timing patterns are applied to identify the defect. Table A, in effect, lists the defect signatures for each pixel defect.

Figure 4B:
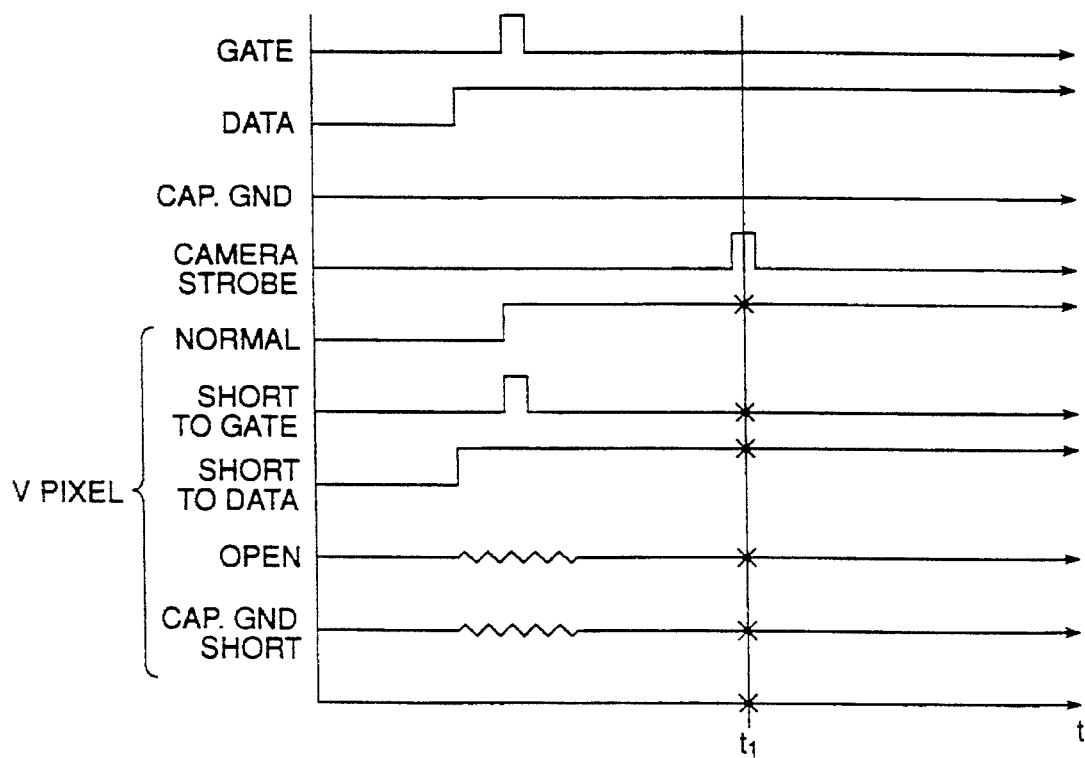

FIG. 4b shows signal patterns under data-high timing. As shown, the gate lines 15 are pulsed as in normal timing, but the data lines 13 are left high until after the camera strobe captures an image sample at time $t_1$. In addition, the ground level is low as for normal timing. The pixel voltage responses under various defect conditions are shown in FIG. 4b, with the value occurring at the time of the camera strobe listed in table A as the data-high timing results. Note that only a normal pixel or a pixel having a short to pixel data line will have a logic-high voltage level. Thus, using the data-high timing results in conjunction with the normal timing results, the computer 58 identifies a pixel having a short to pixel data defect. In particular, a comparison of the results for normal timing and data-high timing for each pixel determines which pixels have a short to pixel data. Voltage images of the panel 16 show a non-conductive pixel during normal timing and a conductive pixel during data-high timing.

Figure 4C:
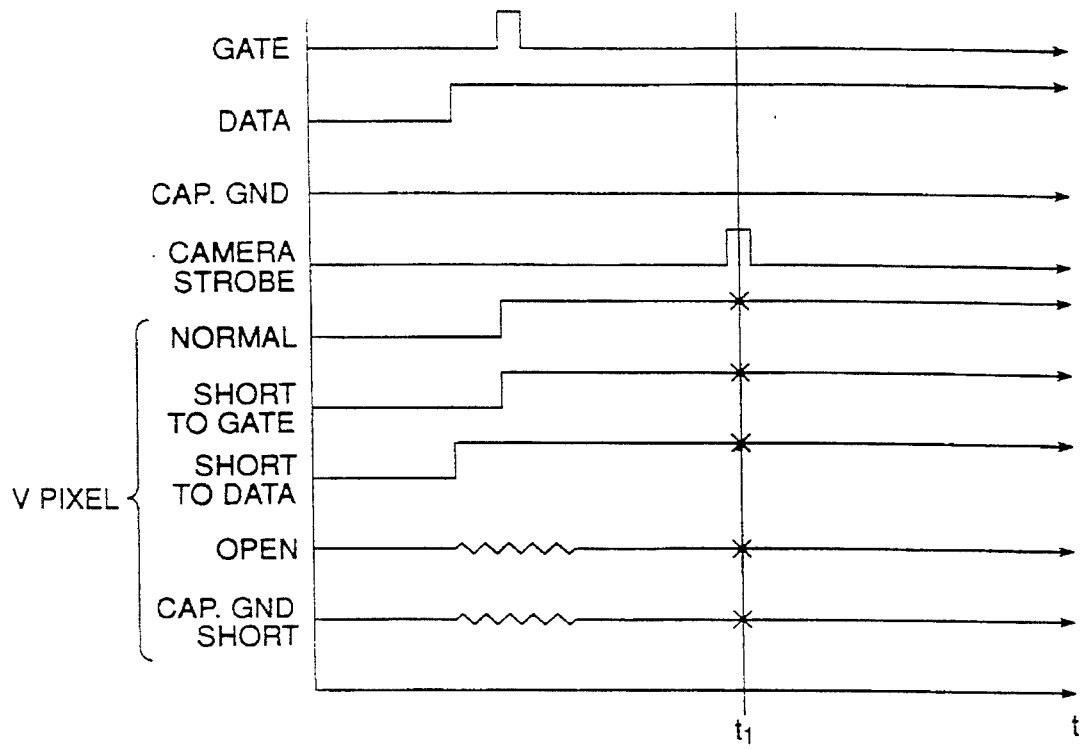

FIG. 4c shows signal patterns under gate-high timing. As shown, the gate lines 15 and the data lines 13 are left high until after the camera strobe captures an image sample at time $t_1$. The pixel voltages results under various defect conditions are shown in FIG. 4c, with the value occurring at the time of the camera strobe listed in table A as the gate-high timing results. Note that only a normal pixel or a pixel having a short to pixel data or a short to pixel gate will have a high voltage level. Thus, using the gate-high timing results in conjunction with the data-high timing results and the normal timing results, the computer 58 identifies a pixel having a short to pixel gate defect. In particular, a comparison of the results for normal timing, data-high timing and gate-high timing for each pixel indicates that only a short to pixel gate defect appears as a logic low (inactive, non-conducting) pixel during normal timing and data-high timing, while appearing as a high (active, conducting) pixel during gate-high timing.

Figure 4D:
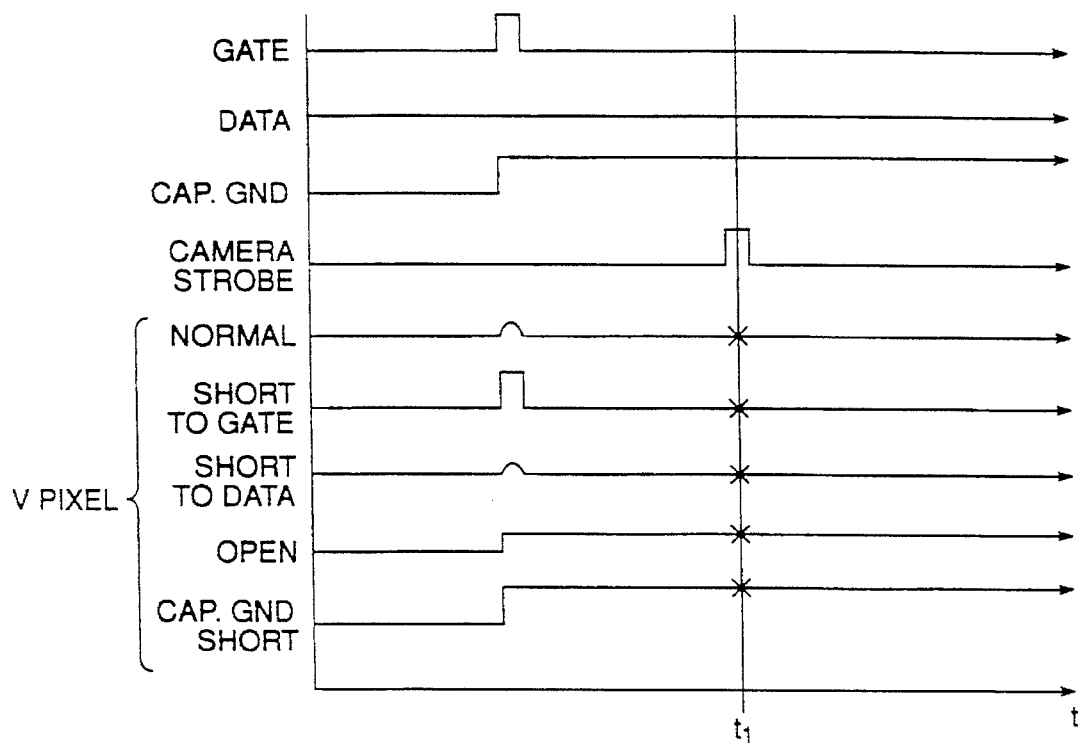

FIG. 4d shows signal patterns for capacitor-high timing. As shown, the gate lines 15 are pulsed and the data lines 13 are left low. The ground level for the ground line coupled to each of the storage capacitors 18, however, is increased to a high voltage level until after the camera strobe captures an image sample at time $t_1$. The resulting pixel voltages under various defect conditions are shown in FIG. 4d, with the value occurring at the time of the camera strobe listed in table A as the cap-high timing results. Note that only a short to capacitor ground defect results in a pixel voltage at a high level. Further, note that only a TFT (thin-film transistor) open circuit defect results in an intermediate voltage level between a low and a high voltage level. Thus, cap-high timing can be used alone to identify TFT open circuit defects and short to capacitor ground defects.

For each pixel defect identified, the pixel location and the defect type (e.g., short to pixel gate, short to pixel data, open pixel defect, short to capacitor ground) are stored in a repair file.

Identification of Line Defects

The line defects include line-to-line shorts (e.g., data line to data line, or gate line to gate line), cross shorts (e.g., data to gate), and open line defects. Data line to data line shorts are identified by applying a first voltage of one polarity to the even data lines and a second voltage of another polarity at the odd data lines using normal timing as described for the pixel defect procedures. If data line to data line shorts are present, then a voltage divider is formed at the lines involved as shown in FIG. 5.

Figure 5:
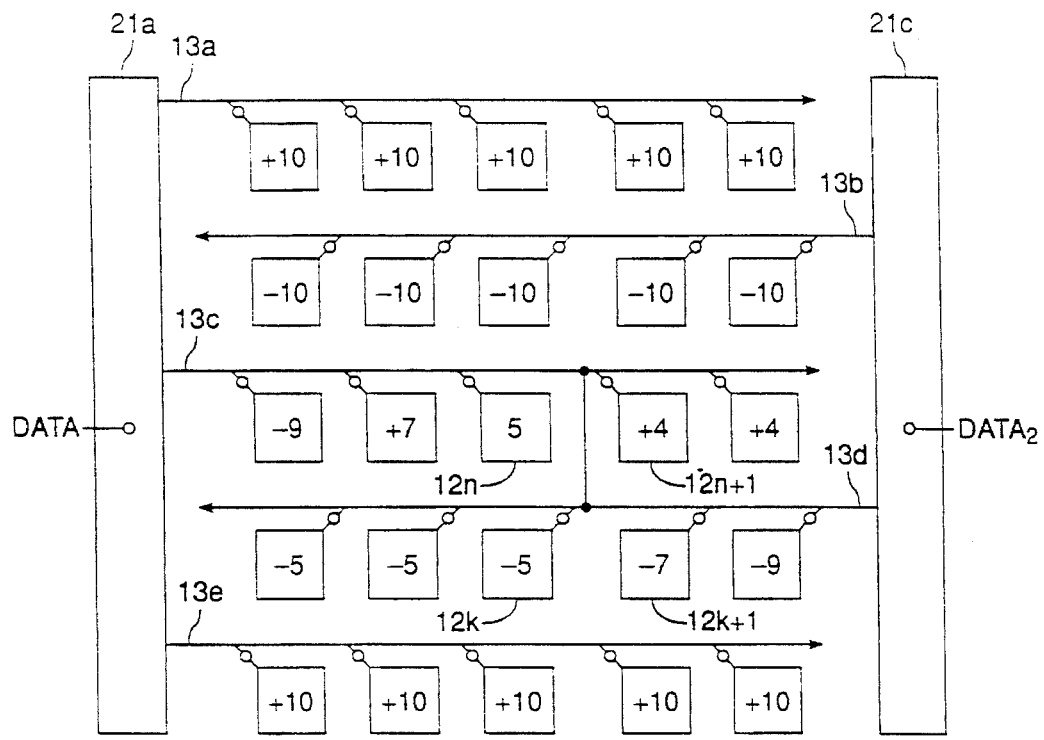
FIG. 5 is a block diagram of a partial pixel array showing the voltages detected for a line-to-line short circuit defect.

FIG. 5 shows the voltage imaging results for a data line to data line short when a +10 volt signal is applied to shorting bar 21a and a −10 volt signal is applied to shorting bar 21c. For simplification, only the data line connections are shown. As depicted, the short occurs between data line 13c and 13d. Thus, the pixels on lines 13a, 13b and 13e are not effected as shown by the correct +10 or −10 voltages. At line 13c which receives a +10 volt signal, the pixel voltages decrease from [ml]M]to +7 and +5, then are constant at +4 beyond the short. At line 13d which receives a −10 volt signal, the pixel voltages increase from −9 to −7, then are constant at −4 beyond the short. The location of the line-to-line short thus in the region between pixels 12n and 12n+1 on line 13c and between pixels 12k and 12k+1 on line 13d.

A gate line to gate line short is similarly identified for an interdigitated panel having even gate lines terminate at one shorting bar and odd gate lines terminate at another shorting bar.

Figure 6:
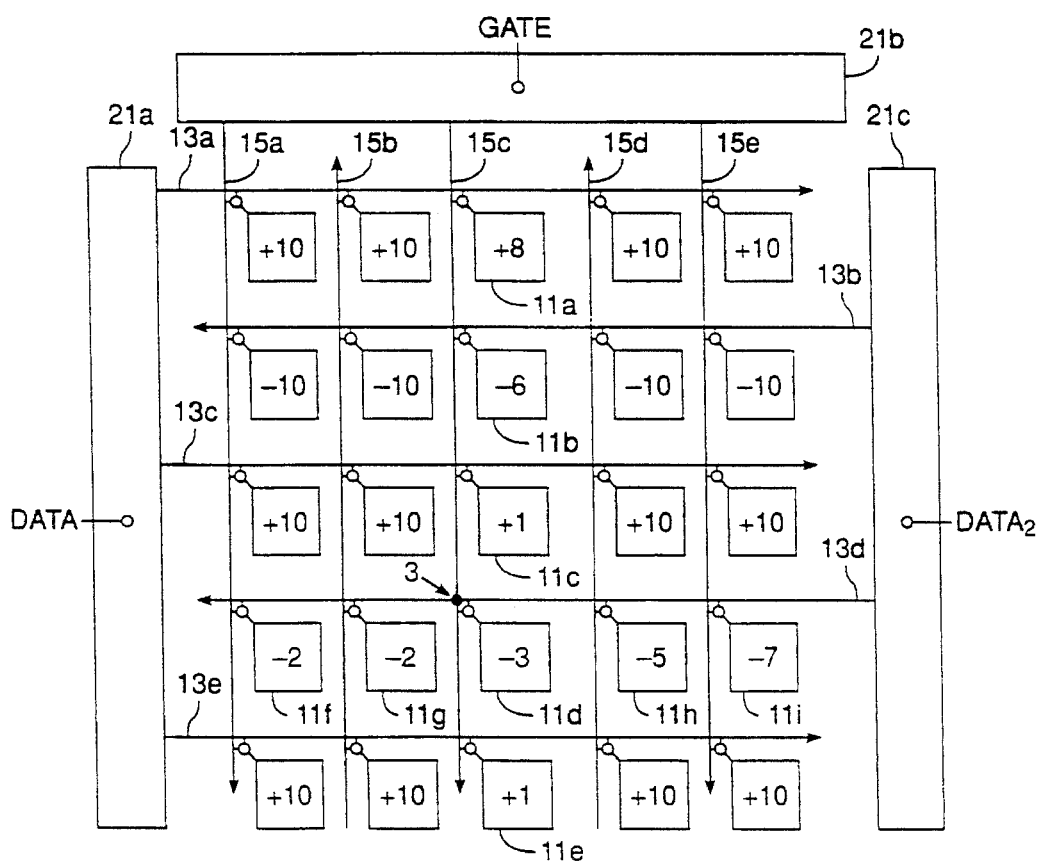
FIG. 6 is a block diagram of a partial pixel array showing the voltages detected for a cross short circuit defect.

FIG. 6 shows the voltage imaging results for a cross short at Junction J between a gate line 15c and a data line 13d when normal timing, as described above, is applied to the data lines 13 and gate lines 15. All pixels coupled to the shorting lines have a voltage which varies from the expected +/−10 volts. For example, the pixels 11a, 11b, 11c, 11d and 11e coupled to gate line 15c have voltages of +8, −6, +1, −3 and +1, respectively. The pixels 11f, 11g 11d, 11h and 11i coupled to data line 13d have voltages of: −2, −2, −3, −5 and −7, respectively. The cross-short is at the intersection J of these anamolous pixel voltages. This may not work if the short is so bad that it would cause a true open by overcurrent.

Figure 7:
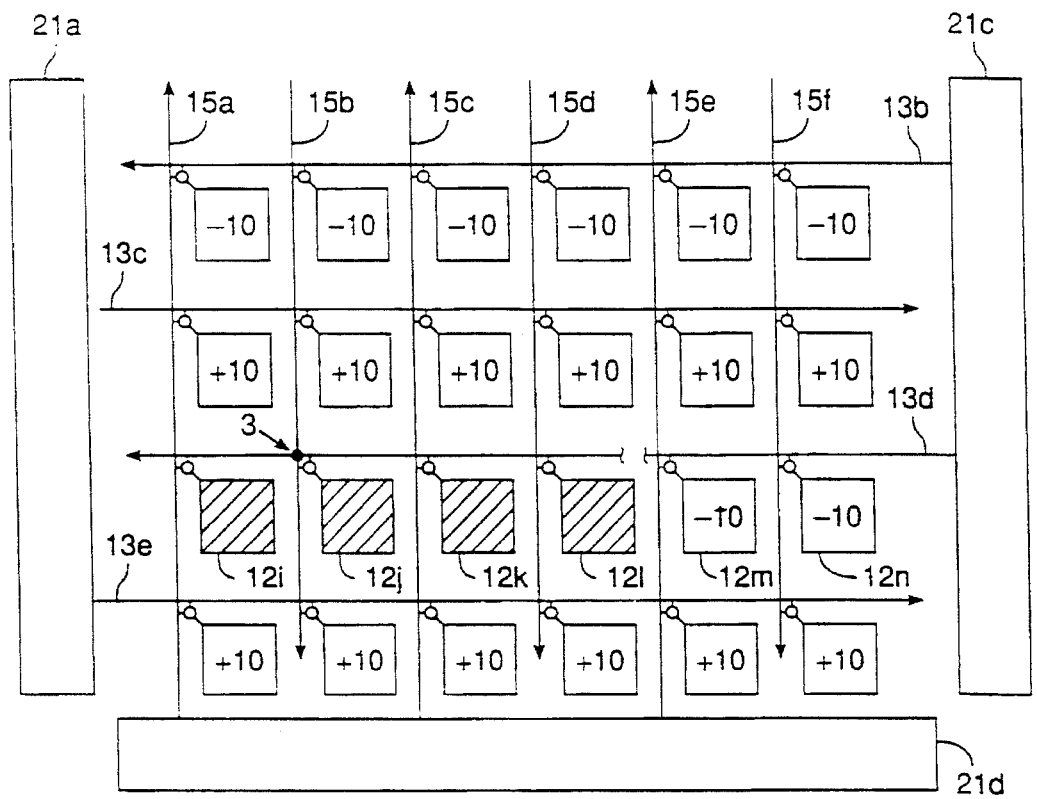
FIG. 7 is a block diagram of a partial pixel array showing the voltages detected for an open line defect.

FIG. 7 shows the voltage imaging results for an open line defect 19. The open defect 19 is depicted along line 13d between pixels 12l and 12m. Before the open defect 19 at pixels 11m, 11n the pixel voltages are the expected −10 volts. Beyond the open circuit at pixels 12i, 12j, 12k and 12l the pixel voltage is zero.

In each of the line defect inspection operations described above, timing such as normal timing as described above is applied and a voltage image of the pixel voltages is obtained. Alternatively, however, the data lines and gate lines can be imaged for continuity. For example, the data lines can be driven high and the gate lines left low. The voltage image would identify the conductivity paths along the data lines. If any gate lines are conducting current, then a cross-short is present, and the voltage divider image of FIG. 5 is captured for the pixels in the area of the cross-short. If a data line open circuit defect is present then the precise location of the open circuit defect is captured in the image. If a data line to data line short occurs between an odd data line (receiving a +10 v signal) and an even data line (receiving a −10 v signal), then the voltage of the lines involved will vary over the length of the lines.

Similarly, the gate lines can be activated while the data lines are left low. Again cross-shorts are evident from conducting data lines and active pixels. Further, the precise location of a gate line open circuit defect is captured in the voltage image.

For each line defect identified, the location and defect type are stored in a repair file.

Fabrication Process Performance Indications

In addition to identifying the type and location of pixel defects, additional information also may be obtained which is useful for evaluating the fabrication process of the active plate. Pixel decay (leakage), turn-on time and parasitic capacitance uniformity are measurable across the active plate of the panel 9 using the imaging system 10. Such information heretofore has not been obtainable or available to the active matrix LCD panel manufacturer. Such information can be used to evaluate the fabrication process, enabling modifications so as to improve panel yields.

Figure 8:
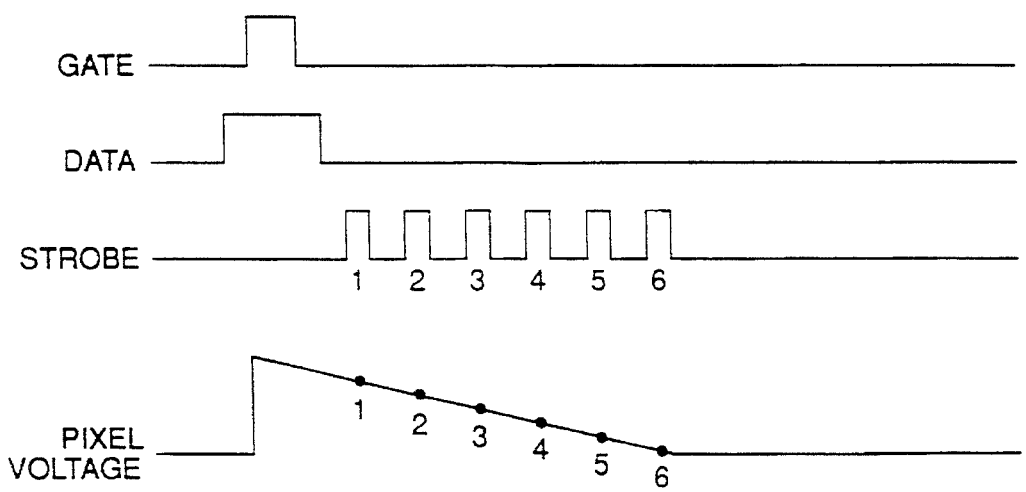
FIG. 8 is a chart of a timing pattern applied to the active plate to measure pixel decay time.

Pixel Decay Performance:

FIG. 8 is a chart of gate line and data line timing applied to the panel 9 for obtaining pixel decay measurements. As shown, the gate lines 15 and data lines 13 are pulsed as for the normal timing described above. The camera strobe, however, captures a voltage image at a time after the gate lines 15 and data lines 13 return low. According to one embodiment, six samples are taken at different time frames, with each time at successive time intervals relative to the frame of 1 to 2 milliseconds. However, the number of samples and interval between samples may vary. The interval is determined by the camera strobe signal. The camera strobe widths employed are limited by the type of camera used. Strobe widths down to 0.5 milliseconds are common with rates down to 0.1 milliseconds also being available for certain camera systems. By capturing several voltage images with successively delayed camera strobe timing, data for determining a time constant for the decay of each pixel is obtained.

Figure 9:
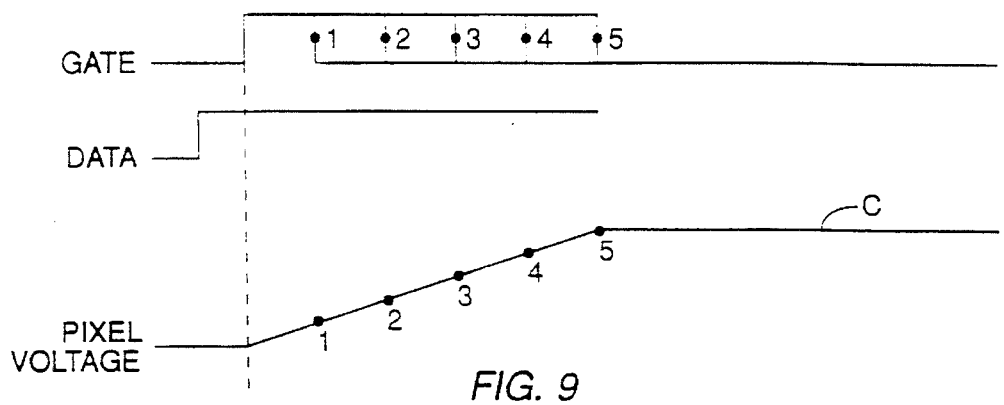
FIG. 9 is a chart of timing patterns applied to the active plate to measure pixel turn-on time.

Turn-on Performance:

FIG. 9 shows a timing pattern for capturing the turn-on time constant of a pixel 11. According to the timing pattern shown, an image sample is captured during five different display cycles. During a first cycle, a narrow gate pulse is used and the data line is left high. During the next cycle, a wider pulse is used, while the data line again is left high. During five cycles, five different pulse widths (1, 2, 3, 4, 5) are used for the gate lines. Such pulse widths are selected so the pulse widths vary up to a large pulse width (5) sufficient to fully charge the pixel to the data line voltage level. At the smaller pulse widths the pixel is not able to fully charge up to the data line voltage level. By measuring the pixel voltage at the various gate pulse widths a charging curve c as shown in FIG. 9 is obtained. A pixel turn-on time constant for each pixel also is obtained based on the same information.

Parasitic Capacitance Uniformity:

Each thin film transistor 17 includes a parasitic capacitance across the gate and drain. The value of such capacitance relative to the capacitance of the storage capacitor 18 at a corresponding pixel 11 has a significant effect on the pixel voltage at the pixel 11. The pixel voltage ideally approaches the data line voltage when the gate line is pulsed. However, the actual pixel voltage will be less than the data line voltage by a value dV during normal timing. Such value dV is approximately equal to the gate line voltage times the ratio of parasitic capacitance to storage capacitance. A uniform parasitic capacitance is desireable from TFT to TFT.

During the gate-high timing of FIG. 4c, the pixel voltage reaches the data line voltage. During the normal timing of FIG. 4a, the pixel voltage reaches the data line voltage less the value dV. Thus, by capturing the pixel voltage for each timing, then subtracting the two voltages the value for dV is achieved for each pixel. Since dV, the gate line voltage and the storage capacitance are now known, the parasitic capacitance value can be determined for each TFT. Thus, the uniformity of the parasitic capacitance on an active plate is determined.

Laser-Based Repair System

Figure 10:
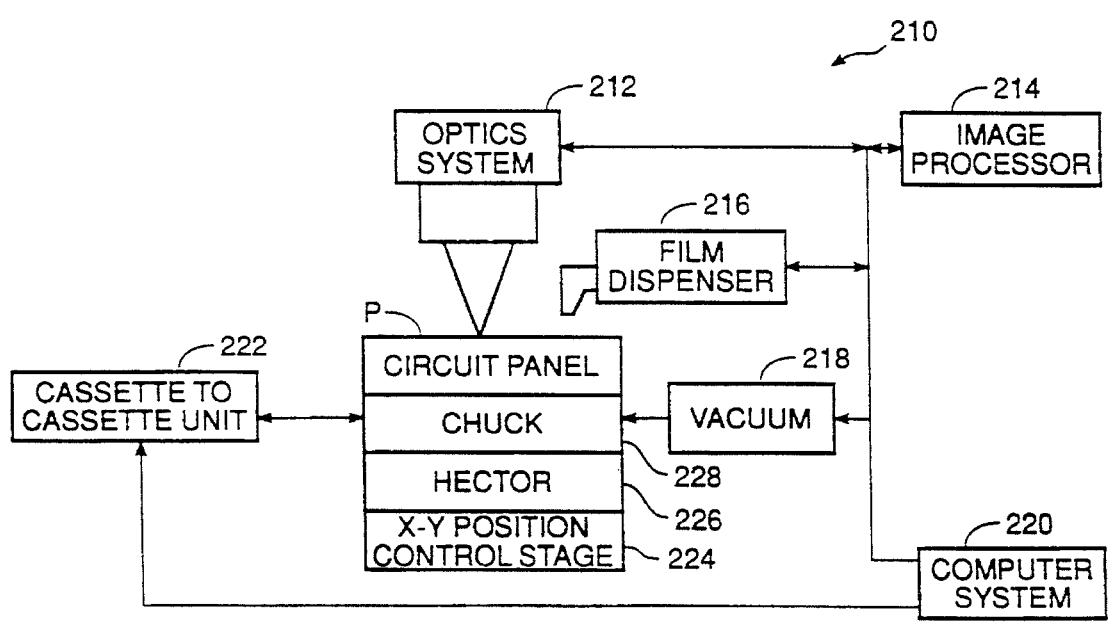
FIG. 10 is a block diagram of a laser-based repair and deposition system.

FIG. 10 shows an embodiment of the laser-based repair system 210 of commonly-assigned U.S. patent application Ser. No. 07/687,473, filed Apr. 18, 1991 for LASER-BASED SYSTEM FOR DEPOSITION AND REMOVAL. As previously recited, such patent application is incorporated herein by reference and made a part hereof. The function of the repair system 210 is to repair panel defects identified by the test system 10.

The repair system 210 includes optics system 212, image processor 214, film depositor 216, vacuum 218, computer 220, cassette unit 222, position control stage 224, optional heater 226 and chuck 228. Several panels are stored in a cassette unit 222 for automatic retrieval. Circuit panel P is retrieved from the cassette unit 222 and positioned on chuck 228. Vacuum 218 holds the panel P to the chuck.

The panel is aligned with the optics system by the X-Y position stage 224. The optics system 212 feeds back image information to the computer system 220 through the image processor to identify the alignment. Based upon such feedback, the computer system 220 controls the X-Y stage 224 to properly position the panel P.

To repair defect on a circuit panel P, the computer system 220 accesses a repair file generated by a test system 10, 110 and input to the computer system 220. Such file includes panel defect information including the type of defect and the location of the defect. Based upon such information, the computer system 220 causes the optics system 212 to position an exomer laser in the vicinity of a defect to be repaired. Depending on the type of defect, the excimer laser performs prescribed operations to remove selective material and cut conductive lines. Select passivation (i.e., silicon nitride) is removed without disturbing the conductive lines below.

Thereafter, the film dispenser 216 deposits a film over an area of the panel in the vicinity of the defect. According to one embodiment, the film is a palladium acetate film or other organic metallic film (e.g., solid-state film). The dispenser deposits a film of approximately 5 to 10 microns in width over a given length which may exceed 200 microns. In liquid form, the film is approximately 30 microns thick. The optional heater 226 heats the panel P to enhance drying of the film. When drying, evaporation causes the film thickness to reduce to approximately one micron.

Once dry, another laser of the optics system 212, an argon-ion laser, then traces a line on the film so as to decompose the line of film and form a conductive path. The line becomes conductive by a photo-pyrolytic reaction between the light and the film. The decomposition process turns the approximately one micron thick film line to an approximately 0.1 micron thick conductive path. A cleaning agent such as vapor phase isopropyl alcohol can then be used to remove the excess film.

Open Defect Repair

Figure 11A:
FIGS. 11a–b depict a repair process for an open circuit defect.
Figure 11B:
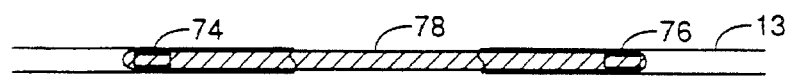

FIG. 11a shows a conductive line 13 having an open circuit defect. To repair the defect, passivation covering the conductive line is removed on each side of the open circuit at areas 74, 76. Film then is deposited and a laser applied as described above to form a conductive path 78 which contacts each of the exposed areas 74, 76 (FIG. 11b).

Cross-Short Repair

Figure 12A:
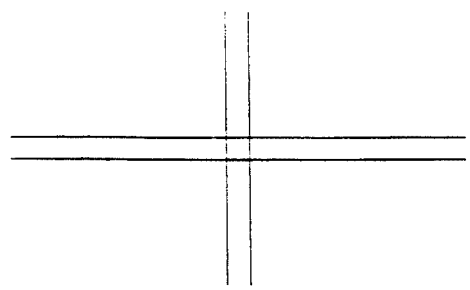
FIGS. 12a–c depict a repair process for a cross short circuit defect.
Figure 12B:
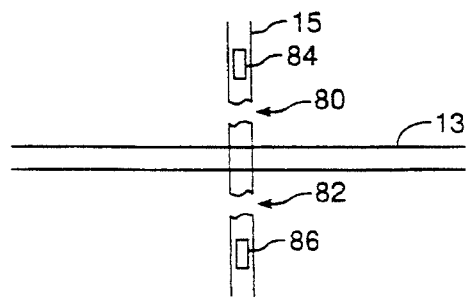
Figure 12C:
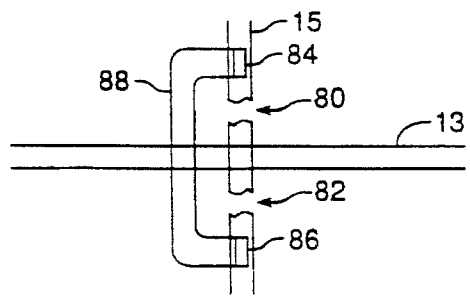

FIG. 12a shows a cross-short between data line 13 and gate line 15. To repair the defect, the gate line 15 is cut at locations 80, 82 to sever the short circuit. In addition, the laser removes passivation from the gate line in areas 84, 86. Film then is deposited and a laser applied as described above to form a conductive bridge 88 which contacts each area 84, 86 without shorting to data line 13 (FIG. 12b). The same procedure may be employed wherein the data line 13 is cut and bridged.

Line-to-Line Short Repair

Figure 13A:
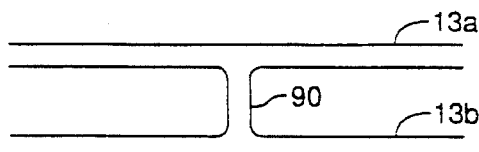
FIGS. 13a–b depict a repair process for a line-to-line short circuit defect.
Figure 13B:
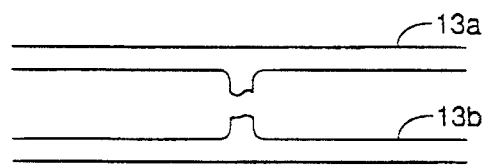

FIG. 13a shows a line-to-line short 90 between two data lines 13a, 13b. To repair the short the laser cuts the conductive path at short 90 to separate the data lines 13a, 13b (FIG. 13b).

Redundant Structures

Figure 14:
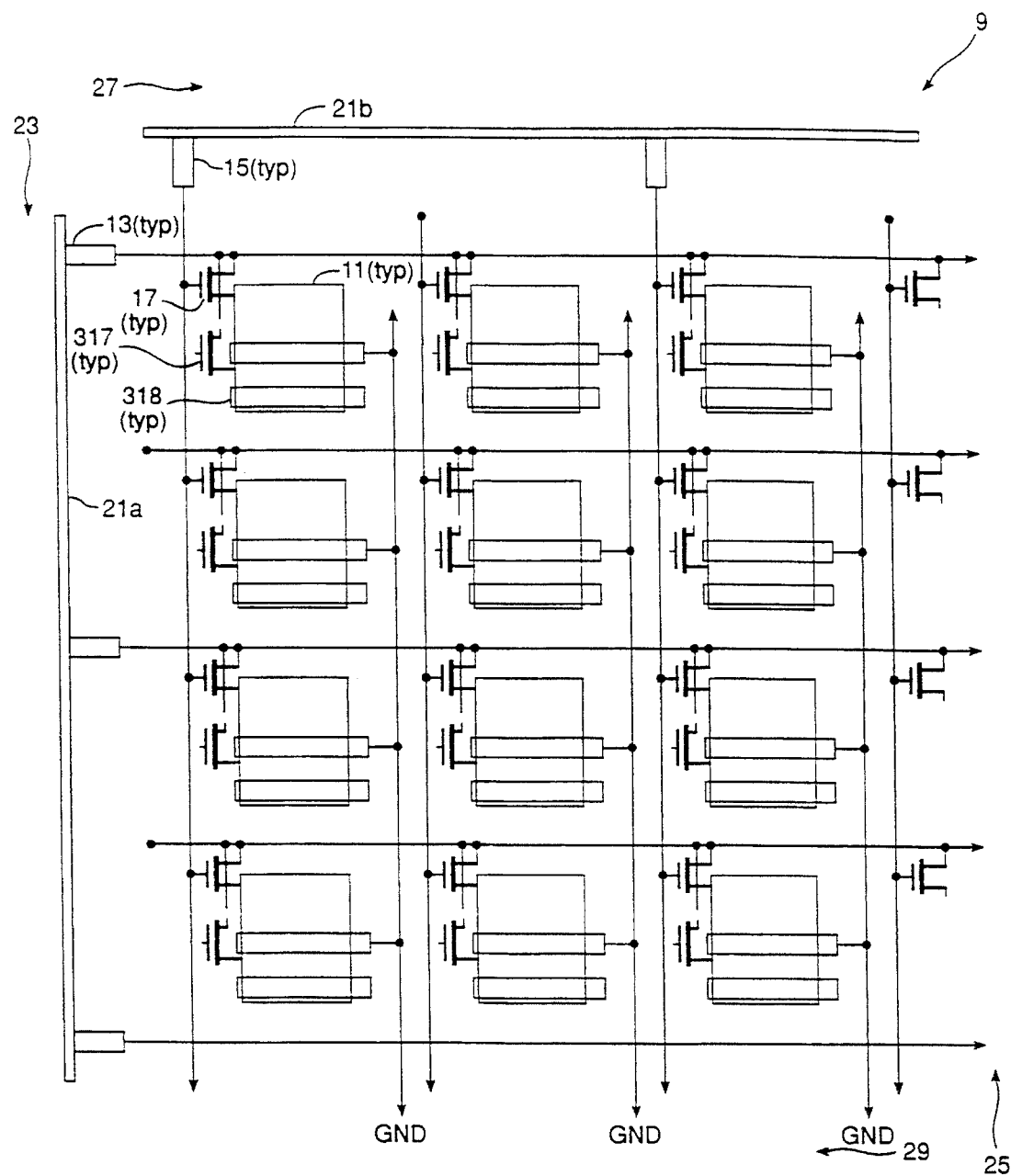
FIG. 14 is a block diagram of a portion of an active plate having a redundant thin film transistor and a redundant storage capacitor for each pixel in accordance with the invention.

FIG. 14 shows an alternative configuration for a pixel area on an active plate 9. A gate line 15 and drive line 13 are respectively coupled to the gate and source of a thin film transistor ("TFT") transistor 17. The drain of such transistor is coupled to the pixel 11. A storage capacitor 18 also is coupled to the pixel. A ground line is coupled to the storage capacitor 18. Such structure is the same as previously described for the pixels of FIG. 1. FIG. 14, however, shows the pixel 11 further including a redundant TFT transistor 317 and a redundant storage capacitor 318. The gate and drain for the redundant TFT transistor 317, however, are left as open circuits. In addition, the redundant storage capacitor 318 is coupled to pixel 11, but is left as an open circuit without connection to the ground line.

If a short to ground, short to gate or open pixel defect is found at the pixel 11 of FIG. 14, then the connections between the gate line and gate of the TFT 17 and between the data line and source of the TFT are cut using the laser of the optics system 212. In addition, conductive paths are formed at the redundant TFT 317 to couple the gate and source to the gate line and data line, respectively. Such paths are formed using the deposition methodology described above for repairing an open circuit defect.

If a short to capacitor ground is found at the pixel 11, then the connection between the storage capacitor 18 and ground line is cut with the laser of the optics system 212. A conductive path then is formed between the redundant storage capacitor 318 and the ground line.

Concluding Remarks

Identifying defect locations on a partially assembled active matrix LCD panel is viable way of evaluating the active matrix fabrication process. The inspection methods described above identify defect types and defect locations, identify decay performance (e.g., leakage) and turn-on performance of the thin-film transistors and identify the uniformity of the parasitic capacitances across the TFTs from pixel to pixel. Such information adds advantages to the panel manufacturer, providing them with heretofore unavailable information. Such information represents performance parameters which aid in evaluating and improving the active plate fabrication process. Accordingly, production yields can be improved by modifying the fabrication process as needed.

Further, the identification of defect locations can be used to perform repair operations as needed - again, resulting in increased production yields.

Figure 15:
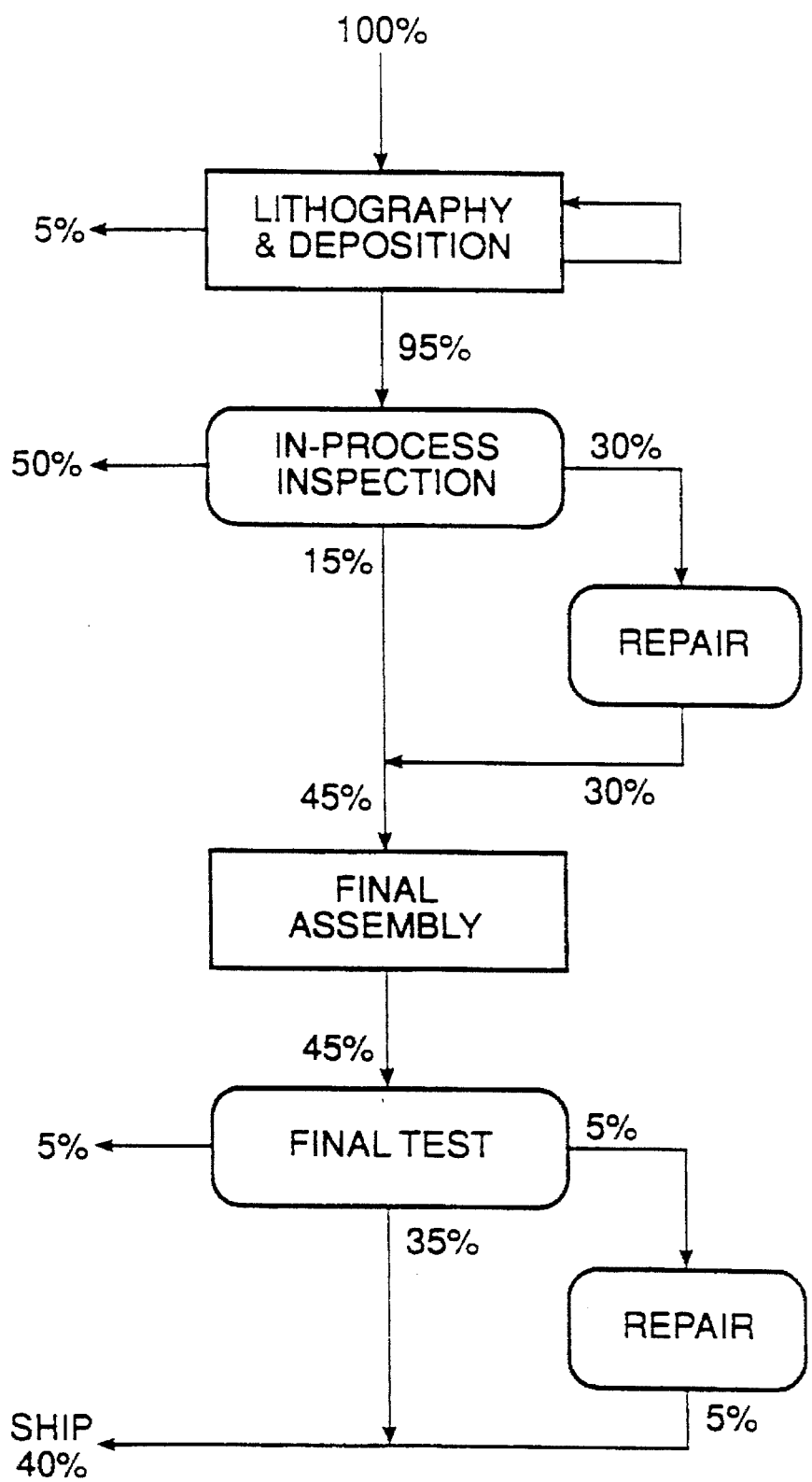
FIG. 15 is a flow chart of an active matrix LCD production process, including the inspection and repair processes of this invention.

FIG. 15 shows a process flow for the fabrication of an active matrix LCD which undergoes inspection and repair according to an embodiment of this invention. A batch of panels (100%) undergoes lithography and deposition processing 92 to form the unfinished active matrix panel. Based on typical yields, approximately 5% are discarded during such processing as defective. Thus, 95% of the panels undergo in-process inspection 94 for pixel defects and line defects. Approximately 15% of the original batch pass inspection as having no defects. Approximately 50% of the original batch are discarded as being too defective to repair (e.g., too many defects to repair cost effectively). The remaining 30% undergo the repair process 96, as described above. Thus, 45% of the original batch make it to final assembly 98. After final assembly 98, approximately 35% of the original batch pass inspection 100 as having no defects. Approximately 5% are discarded as being too defective to repair. The remaining 5% are repaired at step 102. Thus, 40% of the original batch are available for shipment. Such a yield is a significant improvement over the typical 10% yields known in the industry for systems unable to provide panel defect repair.

The invention has now been described with reference to specific embodiments. Other embodiments will be apparent to those of ordinary skill in the art. For example, although the inspection and repair methodology has been described for an active matrix LCD panel, the invention also may be applied to other flat panels, including circuit boards and multi-chip modules. It is therefore not intended that this invention be limited, except as indicated in the appended claims.

What is claimed is:

1. A method for inspecting an active plate having a pixel array, a plurality of pixel drive elements and a matrix of data lines and gate lines, each one pixel in the array being coupled on one gate line and one data line in the matrix by a pixel drive element, a plurality of data lines of the matrix terminating at a first shorting means, a plurality of gate lines terminating at a second shorting means, the method comprising the steps of:

applying a first timing pattern to the first shorting means and second shorting means;

capturing a voltage image of a first area of the active plate from said step of applying said first timing pattern to obtain first pixel voltage data for pixels within said first area;

determining whether the active plate has more than a first number of defects based upon said first pixel voltage data;

and for an active panel having less than said first number of defects, applying a second timing pattern to the first shorting means and second shorting means;

capturing a second voltage image of a second area of the active plate from said step of applying said second timing pattern to obtain a second pixel voltage data for pixels within said second area; and comparing the first pixel voltage data and the second pixel voltage data to identify a first pixel common to said first area and to said second area which has a short circuit to a data line.

2. The method of claim 1 further comprising steps of:

applying a third timing pattern to the first shorting means and second shorting means;

capturing a third voltage image of a third area of the active plate from said steps of applying said third timing pattern to obtain third pixel voltage data for pixels within said third area; and comparing the first pixel voltage data, the second pixel voltage data and the third pixel voltage data to identify a second pixel common to said first area and to said second area which has a short circuit to a gate line.

3. The method of claim 1 in which the active plate also includes a plurality of storage capacitors, each one pixel in the array being coupled to a respective one storage capacitor of said plurality of storage capacitors, each said one storage capacitor being coupled to a ground signal path, and the method further comprising, for an active panel having less than said first number of defects, the steps of:

applying a second timing pattern to the first shorting means, the second shorting means and the ground signal path, wherein the ground signal path receives a magnitude increase in ground level;

capturing a voltage image of a second area of the active plate to obtain second pixel voltage data for pixels within said first area; and identifying a second pixel within said second area as having a short circuit to ground signal path based on the second pixel voltage data corresponding to said second pixel.

4. The method of claim 3, further comprising the step of:

identifying a third pixel within said second area as having an open circuit defect based on the second pixel voltage data corresponding to said third pixel.

5. A method for identifying a pixel defect in an active LCD display having a pixel array, a plurality of pixel drive elements and a matrix of data lines and gate lines, each pixel being coupled to one gate line and one data line in said matrix, a plurality of data lines of said matrix including a termination at a first shorting means, a plurality of gate lines including a termination at a second shorting means, said method comprising steps of:

applying a normal timing pattern to said first shorting means and said second shorting means;

capturing a first voltage image of a first area of said active LCD display from said step of applying said normal timing pattern to obtain first pixel voltage data for pixels within said first area, said step of capturing said first voltage image of said first area identifying a pixel defect by non-activity of any pixel from said first pixel voltage data;

applying a data-high timing pattern to said first shorting means and said second shorting means;

capturing a second voltage image of a second area of said active LCD display from said step of applying said data-high timing pattern to obtain second pixel voltage data from pixels within said second area;

comparing said first pixel voltage data to said second pixel voltage data; and identifying a location of said pixel defect comprising a short to pixel data defect from said step of comparing said first pixel voltage data to said second pixel voltage data, said pixel defect being common to said first area and said second area.

6. The method of claim 5 further comprising steps of:

applying a gate-high timing pattern to said first shorting means and said second shorting means;

capturing a third voltage image of a third area of said active LCD display from said step of applying said gate-high timing pattern to obtain third pixel voltage data from pixels within said third area;

comparing at least said first pixel voltage data and said third pixel voltage data; and identifying a location of said pixel defect comprising a short to pixel gate defect from said step of comparing at least said first pixel voltage data and said third pixel voltage data, said pixel defect being common to at least said first area and said third area.

7. The method of claim 5 in which said active LCD includes a plurality of storage capacitors, each one pixel in said array being coupled to a respective one storage capacitor of said plurality of storage capacitors, each said one storage capacitor being coupled to a ground signal path, said method further comprising steps:

applying a capacitor-high timing pattern to said first shorting means, said second shorting means, and said ground signal path, wherein said ground signal path receives a magnitude increase in ground level;

capturing a fourth voltage image of said fourth area of said active LCD display from said step of applying said capacitor-high timing pattern to obtain fourth pixel voltage data from pixels within said fourth area; and identifying a short circuit to ground defect pixel defect from at least said fourth pixel voltage data.

8. The method of claim 7 further comprising a step of identifying a open circuit pixel defect from said fourth pixel voltage data.

* * * * *